United States Patent [19]
Blonder

[11] Patent Number: 5,559,868
[45] Date of Patent: Sep. 24, 1996

[54] METHOD FOR SENDING AND RECEIVING VIDEO IMAGES

[75] Inventor: Greg E. Blonder, Summit, N.J.

[73] Assignee: Lucent Technologies Inc., Murray Hill, N.J.

[21] Appl. No.: 113,935

[22] Filed: Aug. 30, 1993

[51] Int. Cl.$^6$ .............................. H04M 11/00; H04N 7/14
[52] U.S. Cl. .................. 379/96; 379/93; 348/13; 348/14
[58] Field of Search .................. 379/93, 94, 96, 379/97, 98, 100, 142, 245, 246, 247, 53, 201, 202; 348/13, 14, 16–19; 455/5.1; 364/479, 518; 375/357

[56] References Cited

U.S. PATENT DOCUMENTS

| | | | |
|---|---|---|---|
| Re. 31,789 | 1/1985 | Hashimoto | 379/142 |
| 4,242,539 | 12/1980 | Hashimoto | 379/142 |
| 4,551,581 | 11/1985 | Doughty | 379/201 |
| 4,567,323 | 1/1986 | Lottes et al. | 379/201 |
| 4,582,956 | 4/1986 | Doughty | 379/142 |
| 4,591,665 | 5/1986 | Foster et al. | 379/142 |
| 4,597,058 | 6/1986 | Izumi et al. | 364/479 |
| 4,805,119 | 2/1989 | Maeda et al. | 379/96 |
| 5,025,395 | 6/1991 | Nose et al. | 364/518 |
| 5,027,400 | 6/1991 | Baja et al. | 455/5.1 |
| 5,033,076 | 7/1991 | Jones et al. | 379/67 |
| 5,054,055 | 10/1991 | Haule et al. | 379/142 |
| 5,056,136 | 10/1991 | Smith | 379/202 |
| 5,191,607 | 3/1993 | Meyers et al. | 379/421 |
| 5,274,699 | 12/1993 | Ranz | 379/142 |
| 5,414,457 | 5/1995 | Kadowaki et al. | 379/357 |

FOREIGN PATENT DOCUMENTS

| | | | |
|---|---|---|---|
| 0436345 | 7/1991 | European Pat. Off. | 379/53 |
| 2223911 | 4/1990 | United Kingdom | 379/53 |

OTHER PUBLICATIONS

The article "Remote Meter Reading System Utilizing the No-Ringing Circuit Service on Existing Telephone Lines" pp. 288–292, Oct. 1983.

The article "Telephones Allowing Dialing and Data Communication with Handset Cradled" pp. 325–327, 1972.

The article "Automatic Meter Reading via Telephone Network to Telemetry Interface Unit" pp. 1–35, 1995.

S. H. Early, A. Kuzma and E. Dorsey, "The VideoPhone 2500 –Video Telephony on the Public Switched Telephone Network", AT&T Technical Journal, 22–32, Jan./Feb. 1993.

H. Aldermeshian, W. H. Ninke and R. J. Pilc, "The Video Communications Decade", AT&T Technical Journal, 2–6, Jan./Feb. 1993.

Contributed by George Lawton, "Bellcore ADSI Standard May Pave Way for 'Super–Phones',"*Telecommunications*, vol. 27, No. 3, 12, Mar. 1993.

H. Newton, "Awash in New Standards," *Teleconnect*, vol. 11, No. 1, 10–18, Jan. 1993.

*Primary Examiner*—Jason Chan
*Attorney, Agent, or Firm*—Katharyn E. Olson

[57] ABSTRACT

A method for sending and displaying customized video images with telecommunications devices is disclosed. In one embodiment of the invention, a video-caller identification scheme is described in which in-band signalling is used to transmit video data.

4 Claims, 3 Drawing Sheets in the video communication, the screen capabilities are wasted. Finally, there is no allowance for an ability to customize a video signal analogous to customized messages on voice answering machines. Thus, no general system exists for transmitting custom video images that permits: 1) imaging or other data signals to be resident with the users; 2) use independent of ISDN availability; 3) two way conversations (i.e. peer-to-peer conversations rather than one way digital imaging); 4) simultaneous transfer of data signals; and 5) capturing the icon to the network terminal.

METHOD FOR SENDING AND RECEIVING VIDEO IMAGES

TECHNICAL FIELD

The invention relates to a method for transmitting information between telecommunications devices. In particular, the invention allows users to send and display customized video images.

BACKGROUND OF THE INVENTION

Rapid technological advances in the communications industry have led to the introduction of new products and services which utilize digital information signals representing data, text and video in addition to voice information signals. The ability to transmit data or information signals as well as voice signals through one such telecommunications system, in particular through the telephone network, is typically accomplished via "in-band" signaling. In-band signaling is a transmission technique in which digital information or data signals are transmitted, in addition to voice signals, through the 3.3 kHz analog bandwidth of a traditional telephone.

In-band signaling is typically performed in one of several ways. For example, Signaling System 7 is used in implementing a caller identification signal to the receiver of an incoming call between the first and second rings. Similarly, the Integrated Services Digital Network (ISDN) allows data transmission at any point during a conversation on the D channel. Other methods for in-band use of voice and data signals include the ADSI standard TR-NWT-001273 which inserts data between voice and the "data under voice."

In-band signaling has been employed in a number of telecommunications services. For example, caller identification schemes have become popular. See, Doughty, U.S. Pat. No. 4,582,956, issued Apr. 15, 1986; Doughty, U.S. Pat. No. 4,551,581, issued Nov. 5, 1985; Jones, et al. U.S. Pat. No. 5,033,076, issued Jul. 16, 1991; Lottes et al., U.S. Pat. No. 4,567,323, issued Jan. 28, 1986; Foster, et al., U.S. Pat. No. 4,591,665, issued May 27, 1986; Hashimoto, U.S. Pat. No. Re. 31,789 reissued Jan. 1, 1985. Likewise, methods to provide more information to the calling party have also been developed. See, Demlow, et al., "Information Display Provided to a Calling Party," Ser. No. 07/953,437, filed Sep. 29, 1992, and assigned to the assignee of this invention.

However, the in-band transmission methods developed thus far are not "rich" in that they fail to more fully exploit the advantages or telecommunications systems. For example, the AT&T Videophone allows users to conduct in-band, private conversations and to send video information. Videophone operation is similar to conventional telephone operation. Person A initiates a telephone call which is then answered by Person B. Person A may elect to transmit images (typically of Person A) captured by a video camera in the videophone to Person B by pushing a button. Person B may then elect to display those images on Person B's videophone display. Similarly, Person B may elect to send, and Person A may elect to receive, images captured by Person B's videophone. See, generally, Scott H. Early, Andrew Kuzma and Eric Dorsey, "The Videophone 2500—Video telephony on the Public Switched Telephone Network," AT&T Technical Journal, pp. 22–32, Jan./Feb. 1993.

Importantly, the capabilities of the videophone and telecommunications network are underutilized. First, there is a delay in initializing the video communication between the callers. Second, if one or both callers elect not to receive a

SUMMARY OF THE INVENTION

The inventive method allows users to customize portions of an audio/video communication. The method allows users to pre-load an image or set of images into the user's telecommunication device. The images, which may be pre-compressed to minimize data transmission requirements, may be sent with the initialization of a communication. Applications include video caller identification schemes. Likewise, the method can provide a "screen saver" or video muting program. Finally, the method can serve as a marketing tool providing an icon for caller identification.

BRIEF DESCRIPTION OF THE DRAWING

Other features and advantages of the invention will become apparent from the following detailed description taken together with the drawings in which.

DETAILED DESCRIPTION

Figure 1:
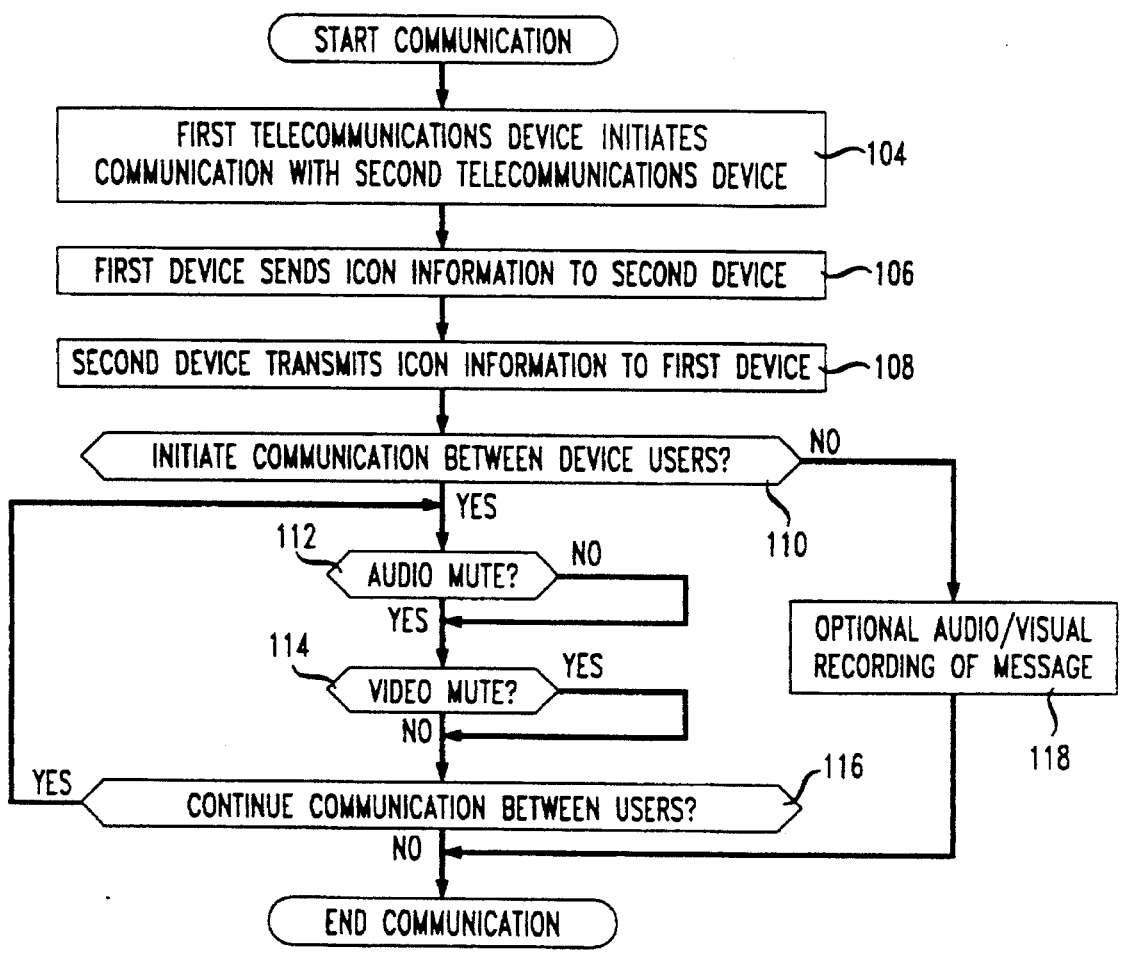
FIG. 1 illustrates a method for video caller identification.
Figure 5:
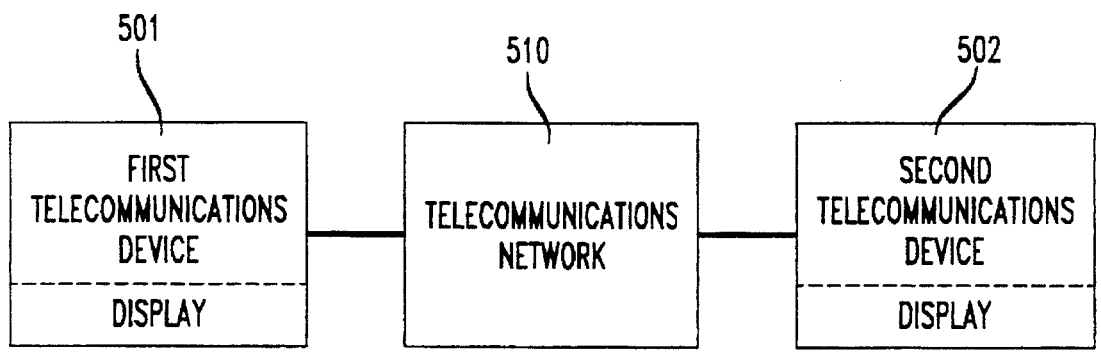
FIG. 5 illustrates first and second telecommunications devices connected to a telecommunications network.

FIG. 1 illustrates a method for one-way or two-way transmission of identification icons for use as caller identifiers in a peer-to-peer, in-band, all digital call between two telecommunication devices. FIG. 5 illustrates a system in which the method of FIG. 1 may be used. In first step 104 a first telecommunications device initiates communication with a second telecommunications device. After communication is established, the first device sends a signal comprising icon information to the second device as indicated in step 106. The icon information may represent stored information such as text, video, audio, data or other information and may identify the caller. The second device then displays or otherwise utilizes the information, e.g. edit or store the information. Either or both users of the telecommunications devices may employ a recoding device (audio and/or video) to screen the communication as shown in step 118. In step 110, the user of the second device may then decide to initiate a communication between users of the devices (i.e. initiate live voice and/or data transmissions) based on the transmitted data displayed on the screen of the second device.

The method illustrated in FIG. 1 may also be configured so that icon information may be transmitted initially from the second device to the first device as shown in step 108 or simultaneously between the telecommunications devices.

The communication is ended when either device terminates the communication. A separate, optional, feature illustrated in steps 112, 114 and 116 of FIG. 1 is a "mute" feature whereby if one user wishes to mute the audio or video portion of the communication, the transmitted data will revert to a specified format (i.e. a preselected audio or video message such as the identification icon).

In this embodiment the method advantageously serves as a one-way or two-way video caller identification scheme. For example, telecommunication device users can elect to transmit an identification icon, e.g. an electronic business card capable of providing logo information as well as name and address information to called parties. Similarly, called parties can also elect to send information to parties initiating calls to confirm that the proper party is being contacted. Importantly, the caller identification may advantageously be sent either before or after any response to the communication need be made. For example with the caller identification schemes described in the background section above, the phone number of the calling party is displayed between the first and second tings of the telephone (e.g. in the case of the telephone network, the second device is still "on hook"). In this way a user of the phone can decide whether to answer the phone based on the information displayed. Alternatively in this embodiment, the signal containing the caller identification information can advantageously be transmitted only after a response to the communication is received (e.g. in the case of the telephone network, the second device would go "off-hook"). Thus, the second device is akin to an answering machine in that communications are initiated between devices, and the second telecommunications device may be used to screen calls and to record audio and video messages.

It should be emphasized here and throughout this specification that telecommunications device may be any device with means for sending and receiving audio signals and video signals which may be represented on a display. Further, the telecommunications device may be capable of storing such signals. By way of example, such devices may include, but are not limited to, personal communicators and video windows on personal computers. The "display" may be visual static (characters or graphical), visual dynamic, audible or tactile (for disabled users), and may be in more than one media (e.g., audio and visual). The display may be controlled by a processor with memory in the telecommunications device itself.

Figure 2:
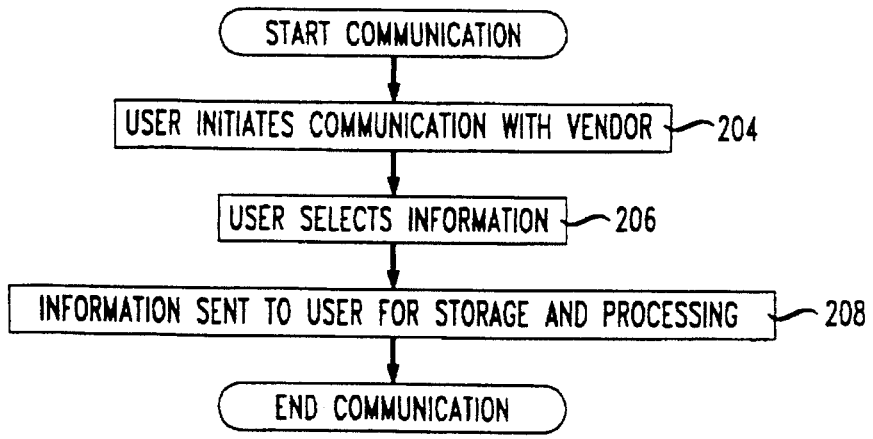
FIG. 2 illustrates a method for transmitting data from a database.

FIG. 2 illustrates a method in which a user communicates with a vendor to request data or information (e.g. images or audio recordings) be transmitted to the user's telecommunication device from the vendor's database so that the user may capture or store the information as an icon for use in identification. The user first simply initiates communications with the vendor and selects the requested information from the vendor's database as shown in steps 204 and 206. The process of selecting the information may be done in a variety of ways. For example, the user may simply tell a vendor which information to transmit. Similarly, a speaker recognition system could be used to identify the information selected. Alternatively, the database may recite a menu of options or send to the user a list of available information for display on the user's telecommunications device. The user may then make a selection in any of a variety of ways, e.g. vocally for the vendor to recognize or by transmitting data indicative of the menu item selected. If only one data or information file is available, no selection process is required. After transmission, the user may store or capture the information for later processing to generate a caller identification signature or icon as indicated in step 208. Finally, either the user or vendor may terminate the communication.

Figure 3:
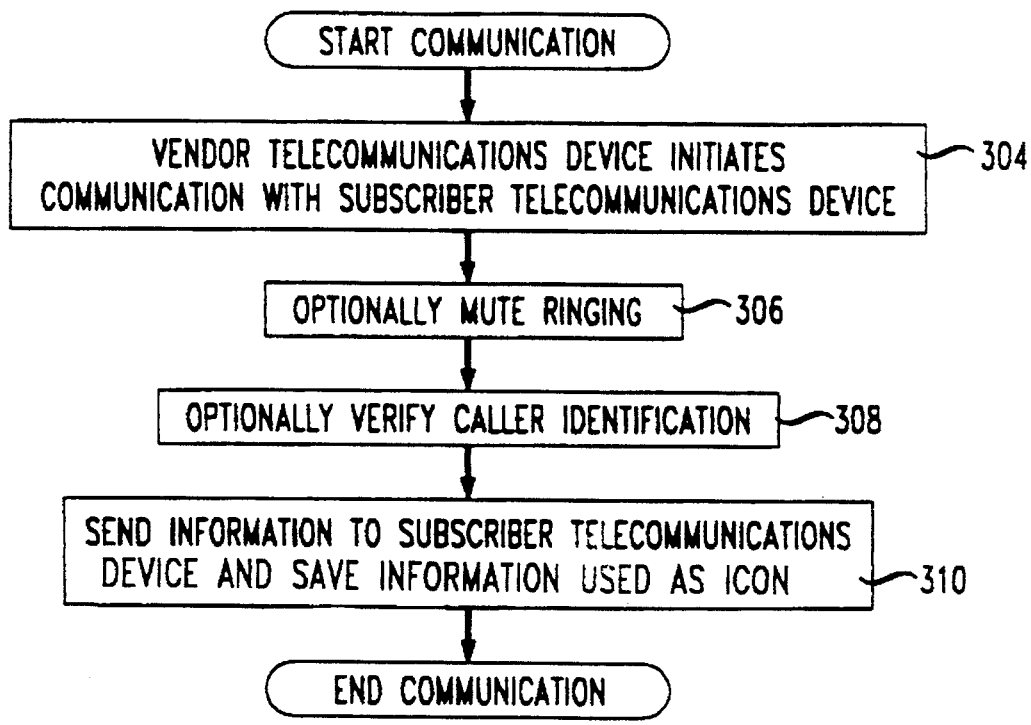
FIG. 3 illustrates a method for transmitting data using a subscription service.
Figure 6:
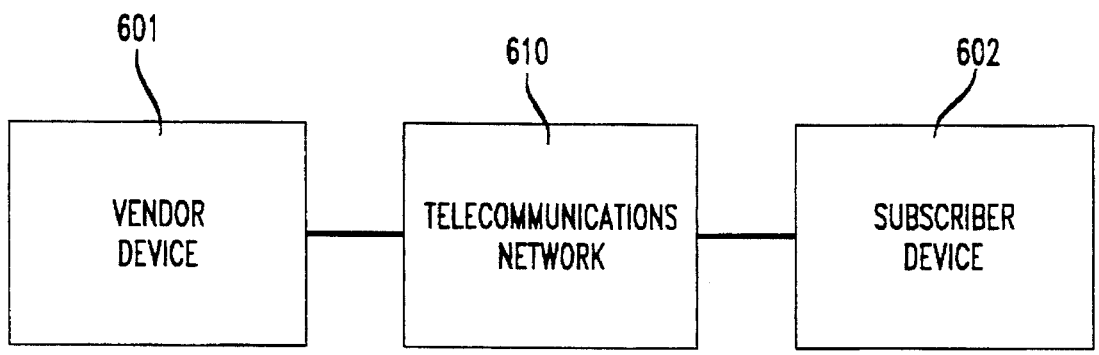
FIG. 6 illustrates a subscriber device and vendor device connected to a telecommunications network.

FIG. 3 illustrates a method for transmitting data using a subscription service in which specific data or information (e.g. a comic strip or cartoon of the day) may be sent to and captured by a subscriber's telecommunications device for use as an icon for identification. FIG. 6 illustrates a system in which the method of FIG. 3 may be used. In first step 304, a vendor telecommunication device initiates a communication with the subscriber's telecommunication device. The subscriber's device then may do any of several things. For example, the subscriber's device may mute any ringing or alerting signal as shown in step 306 since the vendor's device will typically initiate the communication when rates are lowest, i.e. late at night and early in the morning. Likewise, since communications are established, the subscriber's device may verify the caller identification number (e.g. compare it to a list of the numbers of acceptable vendors) as shown in step 308 to be sure that the information to be sent is from the proper vendor and that unwanted solicitations (e.g. advertising or pornography) are screened out. Alternatively, the vendor's device may transmit an in-band code for verification that the information is authorized to be received. After these steps, the vendor's device then transmits the information to the subscriber's device. Finally, a saving function for the information can be enabled by either device before the communication is ended so that the information will be available for use as a caller identification as indicated in step 310. In this embodiment, the method may be used by vendors for periodic delivery of information.

Figure 4:
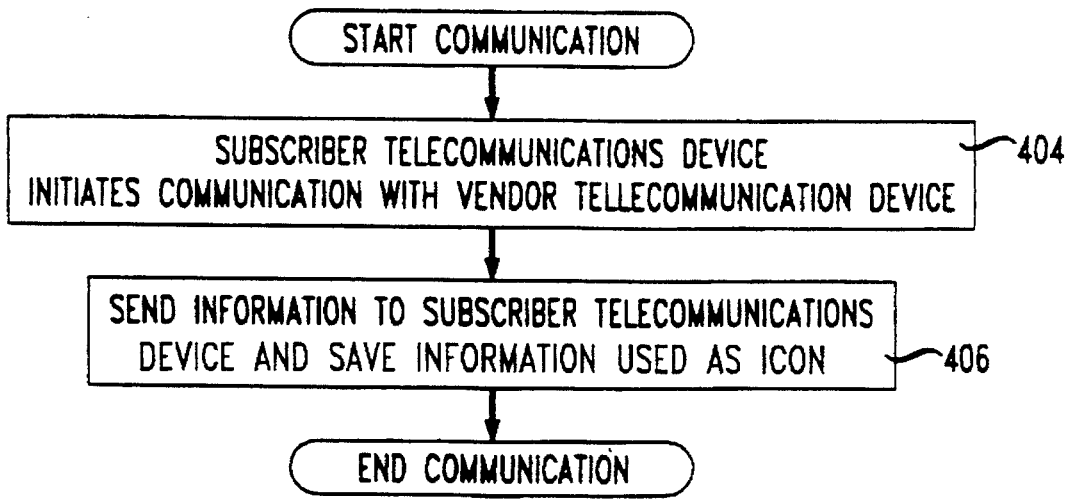
FIG. 4 illustrates a method for transmitting data in response to an autodialed call.

FIG. 4 illustrates a method for transmitting specific data in response to an automatically initiated communication. Unlike the embodiment of FIG. 3, in this embodiment in first step 404 a user telecommunications device initiates the communication with a vendor telecommunications device, as for example to an 800 or 900 number. This call may be pre-programmed to take advantage of lower phone rates or to fit in a time convenient for the user's being ready to receive the data. When the communication is complete, in step 406 the vendor telecommunications device sends the specific data. As with the method in FIG. 3, the signal to enable the data to be saved may be generated so that the image may be stored for later use.

It is to be understood that the above described procedures are merely illustrative of the principles of the invention and many variations may be devised by those skilled in the art without departing from the spirit and scope of the invention. For example, instead of delivering the information for visual display, the process could alternatively relay the information as a voice message. Similarly, the methods have been described without reference to specific hardware or software. Instead, the methods have been described in such a manner that those skilled in the art can readily adapt such hardware or software as may be available or preferable.

I claim:

1. In a telecommunications network connecting a first telecommunications device to a second telecommunications device, a method of selectively switching to in-band signaling between said first and second telecommunications devices, said method comprising the steps of:

initiating a communication between said first telecommunications device and said second telecommunications device, sending a first signal from said first telecommunications device to said second telecommunications device, displaying via said second telecommunications device a first icon represented by said first signal, sending a second signal from said second telecommunications device to said first telecommunications device, said second signal representing a second icon, and thereafter selectively switching said first telecommunications device and said second telecommunications device to in-band signaling based on said first icon.

2. The method of claim 1 wherein said first signal is recorded.

3. The method of claim 1 wherein said first icon identifies a user of said first telecommunications device.

4. The method of claim 1 wherein said telecommunications network is a public switched telephone network.

* * * * *